P. H. KIMBALL.

Corn-Planter.

No 49,121. Patented Aug. 1, 1865.

Witnesses:
Louis R. McLain
James Maire

Inventor:
Philip H. Kimball
By Robbins & Burr
Attys.

UNITED STATES PATENT OFFICE.

PHILIP H. KIMBALL, OF PROPHETSTOWN, ILLINOIS.

IMPROVEMENT IN CORN-PLANTERS.

Specification forming part of Letters Patent No. 49,121, dated August 1, 1865.

*To all whom it may concern:*

Be it known that I, PHILIP H. KIMBALL, of Prophetstown, in the county of Whiteside and State of Illinois, have invented a new and useful Improvement in Corn-Planters; and I do hereby declare the following to be a full, clear, and exact description of the same, reference being had to the accompanying drawings, in which—

Figure 1:
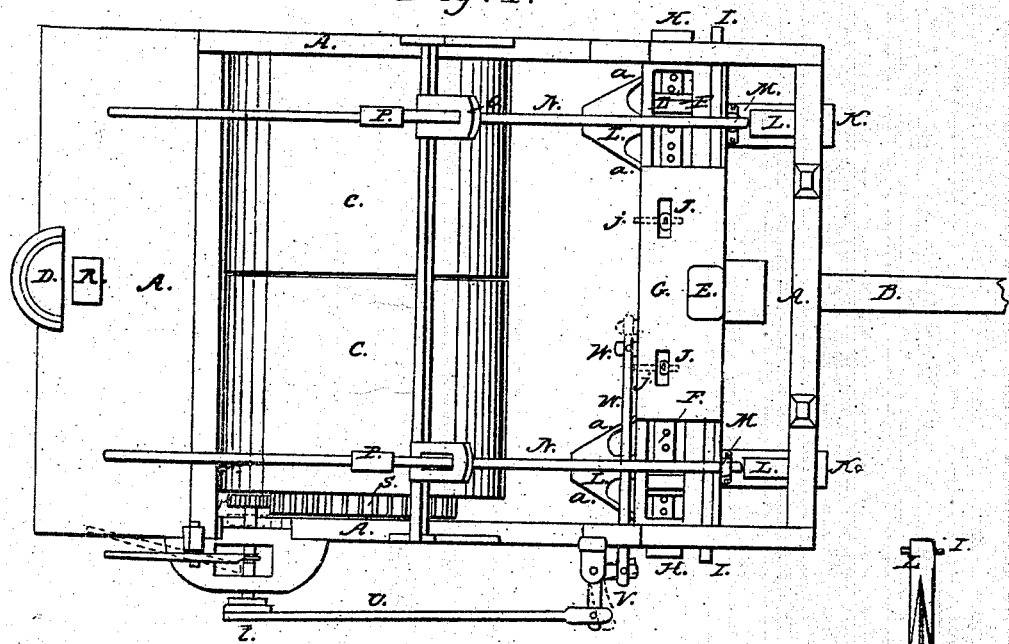
Figure 2:
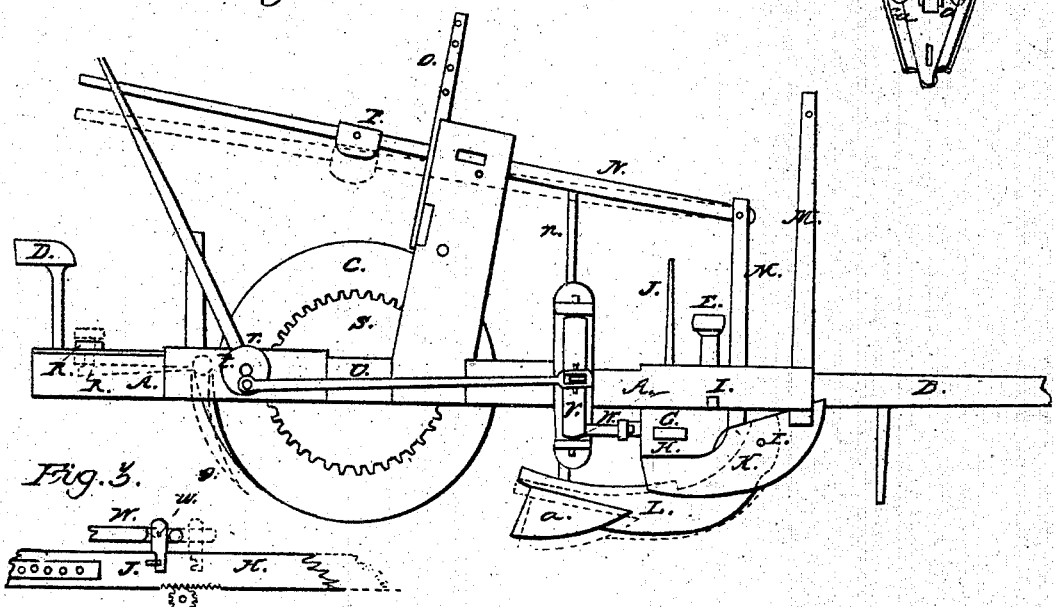
Figure 3:
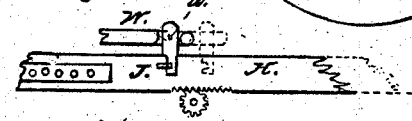

Figure 1 is a plan view of my machine. Fig. 2 is a side elevation of the same; Fig. 3, a plan of a portion of the seed-slide; Fig. 4, a bottom plan of the runner and coverer.

The nature of my invention consists in a peculiar construction of runner and coverer, whereby a furrow is opened into which the seed may fall, which furrow is not only broad enough to allow the seed a proper separation, but is also flat upon its bottom, and impacted by the passage of the runner over it.

It also consists in making the runners independent of each other and the main frame of the machine, so that their action will be uniform, notwithstanding any want of uniformity of the surface over which it is passing.

It also consists in a novel method of rendering the operation of the seed-slide automatic or otherwise, as may be desired, and in rendering its movement uniform and easy.

That others may understand the construction and operation of my machine, I will more particularly describe it.

A is the main frame. B is the tongue to which the horses are attached. C C are the bearing-rollers, upon whose axle the frame A is mounted. D is the driver's seat. E is the drop-man's seat, and F F are the seed-hoppers. In the construction of these parts there is nothing peculiar, and no especial description is required. Across the forward end of the machine is the frame G, upon which is mounted the drop-man's seat E and the seed-hoppers F F, with the seed-slide H and guide-rod I. The seed-slide levers J J are inserted through mortises in the top of the frame G, and are secured or pivoted in said mortises by the pins *j j*, inserted horizontally through the frame G and lever J. The lower ends of the levers J dip into mortises in the seed-slide H, which is caused to slide endwise back and forth as the levers J J, or either of them, are vibrated by the drop-man.

In order to cause the slide to move more smoothly and uniformly the small pinions *h* are inserted and act as rollers against the edge of H, as illustrated in Fig. 3.

The arrangement of cells in the seed-slide and the mode of transferring the seed from the hopper to the tube and furrow does not differ from the method in common use.

The check or guide rod I is simply a rod running through a groove in the frame G, and capable of being projected beyond the side of the machine either way, as indicated by red lines in Fig. 1, so that when the machine is moving in either direction the projected end of the said rod I will form a guide or check to inform the drop-man of the proper instant to operate the seed-slide and drop the seed into the furrow exactly at the proper point to cause the rows of plants to intersect each other, not only at right angles, but to be straight either way.

Attached to the lower side of the frame G and the forward cross-bar of the main frame and near the sides of the machine are the slotted blocks or frames K, the slots being vertical and longitudinal and of sufficient capacity and proper form to contain the heads of the runners L L, Fig. 1, which are secured there by pins *i*, Figs. 2 and 4, which also form pivots upon which the runners move when their rear ends are raised or lowered by the inequalities of the surface over which the machine is moving, or by the action of the attendant. The runner L is curved upon its lower and front edge, and from a pivot below the head through which the pin I passes is formed with a sharp edge down to a point just in front of a vertical line dropped from the openings in the seed-slide. This sharp edge is designed to penetrate and divide the earth in a line with the center of the furrow. At the point where the sharpened edge terminates, the runner is divided vertically by the orifice through which the seed falls, and is thereby caused to swell out on either side of the edge and spread open the furrow divided by the edge of the runner. From this point the lower edge of the runner curves upward again as it runs backward, the dividing-walls being extended some little distance in that direction, forming a lengthened orifice through which the seed may fall unobstructedly.

At the rear end of the runner are two wings, a a, Figs. 2 and 4. They are curved on the lower edge from the front downward in a form similar to the runner. They are spread apart at the front and draw together at their rear ends, so that the earth which was divided and pushed asunder by the action of the main part of the runner is drawn together again by the wings a a and the furrow that was opened by L obliterated.

Upon the forward part of the machine are two posts, M M, to the upper portions of which are pivoted two long levers, N N, that extend thence backward nearly or quite to the rear end of the machine, passing through slots in two guide-pieces, O O, which allow the levers N N to move freely in a vertical direction, but prevent them from swaying in either direction sidewise.

Edgewise through the guides O are holes in which pins may be inserted to limit the vertical movement of the lever N, or either of them, and thereby keep the runners L depressed or elevated within any required limits, the said runners being each connected to the lever above it by rods n n, pivoted to the levers at their upper ends and to the rear ends of the runners at their lower ends, so that as the rear ends of the levers are raised or depressed the rear ends of the runners are also raised or depressed.

Upon the levers N N, at any convenient point, are weights P P, which may be moved forward or backward upon said levers and may be secured at any desired point, the object being to press the runner into the ground with more or less force, as may be desired, according to the condition of the ground or the depth to which it is desired to plant the seed.

The machine is supported upon the axle of the two rollers C C, which occupy nearly the entire space between the side bars of the frame, though it may be considered immaterial whether they have a greater or less breadth of tread so long as it is sufficient to settle the earth over the seed well without packing it so hard as to impede or interfere with the germination of the seed. Behind the rollers C C are suitable scrapers, Q, which are curved on their face to correspond with the curvature of the said rollers. These scrapers are attached to a shaft running across the machine and pivoted at its ends to the side bars of the main frame just back of the rollers. They are attached to said shaft in such a way that when their edges are pressed against the surface of the rollers in order to clean said rollers the weight of the scrapers is then forward of a vertical line dropped from the pivots of the scraper-shaft, and it is obvious that with this disposition of parts, immediately upon the removal of the force which presses the scrapers against the rollers the force of gravity will remove them from that contact, and they will then hang clear of the rollers.

Attached to the scraper-shaft and extending backward to a point convenient to the driver's foot is a lever, R, by means of which the driver is enabled to operate the scrapers at will. In form the scrapers are as though two knives with slightly-concave edges and blades of a lateral curvature to fit the curvature of the rollers were joined at their hilts, the points being as far apart as necessary to embrace between them the entire width of one roller.

In order to render the operation of the seed-slide automatic or under the control of the driver alone the cog driver S is placed upon one end of one of the rollers C, and motion is communicated to the slide H by means of the pinion T, wrist t, connecting-rod U, rock-shaft V, and connecting-rod W. The stud w, immediately connecting the rod W to the slide H, is inserted in a mortise in the edge of the slide, and retained there by the end of the lever J, which passes through a notch in w, as shown in Fig. 3.

The clutch X is provided, for the purpose of enabling the attendant to throw the pinion T into or out of gear, with the driver S.

The operation of my machine is as follows: When the machine is to be transported to the field the levers N N are raised up and secured by a pin in the topmost hole of the guide O, thereby raising the runners clear from the ground and securing them from injury while being transported over the road. When the field is reached the guide-rod I is projected from the proper side as far as desirable, and the dropman takes his seat upon E, the levers N are released from the stop in the guides O and press the runners down into the ground, and the weights P are so placed as to give the requisite pressure upon the runners to force them into the ground as far as desired, to give the seed a proper depth of covering. As the machine moves forward the drop-man operates the slide H by means of levers J at the proper instant to insure the dropping of the seed opposite the check-row, and this proper instant he determines by keeping his eye fixed upon the end of the guide-rod I—a method in common use and well understood. As the machine moves over the field the runners L penetrate the ground at all times to a uniform depth, notwithstanding any inequalities of surface, for, as they are independent of each other, they rise or fall only in conformity with the undulations of the ground in the track of each, no seed being covered too deep nor any left with an insufficient covering.

When it is found desirable to plant the corn in drills instead of in hills by check, a driver alone is needed to attend the machine, for by connecting the slide H with the cog driver S of the roller C (by means of the rock-shaft V, connecting-rods U and W, and pinion T) it will be made to vibrate automatically, so as to drop the seed at regular intervals. The slide H is prevented from clogging by the action of the small pinion $h$, which, engaging in racks in its edge, causes it to jar at each reversal sufficiently to shake the seed through if it chokes therein.

Having thus fully described my improvement, what I claim therein as new, and desire to secure by Letters Patent, is—

1. The peculiarly-shaped runners or shoes L L, constructed and arranged specifically as described, for opening a furrow and covering the seed therein, substantially as herein set forth.

2. So combining the runners L L of my machine with the weighted levers N N, connected to the frame-work thereof, as that each runner and coverer may, under an adjustable degree of pressure, act and operate independently of the other, substantially in the manner and for the purpose herein set forth.

3. In combination with the seed-slide H of my improved corn-planter, the pinions $h$ $h$, operating against the edge thereof, substantially as and for the purpose herein set forth.

4. In combination with the pivoted roller-scrapers Q and the platform and driver's seat of my improved corn-planting machine, as described, the foot-lever R, for the purpose of operating said scrapers, substantially in the manner herein set forth.

The foregoing specification of my improved corn-planter signed by me this 27th day of February, A. D. 1865.

PHILIP H. KIMBALL.

In presence of—
J. S. KIMBALL,
HENRY LEONARD.